(12) United States Patent
Wiley et al.

(10) Patent No.: US 9,176,297 B2
(45) Date of Patent: Nov. 3, 2015

(54) HOUSING FOR OPTICAL COMPONENTS

(71) Applicant: QUALITY ASPIRATORS, INC., Duncanville, TX (US)

(72) Inventors: Keith B. Wiley, Red Oak, TX (US); Corless Wiley, Duncanville, TX (US); Tim M. Fennell, Midlothian, TX (US); John B. Fisher, Grand Prairie, TX (US)

(73) Assignee: QUALITY ASPIRATORS, INC., Duncanville, TX (US)

( * ) Notice: Subject to any disclaimer, the term of this patent is extended or adjusted under 35 U.S.C. 154(b) by 43 days.

(21) Appl. No.: 14/225,294

(22) Filed: Mar. 25, 2014

(65) Prior Publication Data

US 2015/0277078 A1    Oct. 1, 2015

(51) Int. Cl.
| | |
|---|---|
| *G02B 17/00* | (2006.01) |
| *G02B 7/02* | (2006.01) |
| *G02B 7/18* | (2006.01) |
| *G02B 7/00* | (2006.01) |
| *B32B 37/14* | (2006.01) |
| *B32B 37/18* | (2006.01) |
| *B32B 37/12* | (2006.01) |

(52) U.S. Cl.
CPC ............... *G02B 7/025* (2013.01); *B32B 37/12* (2013.01); *B32B 37/142* (2013.01); *B32B 37/18* (2013.01); *G02B 7/003* (2013.01); *G02B 7/1805* (2013.01); *B32B 2037/1253* (2013.01); *B32B 2307/412* (2013.01); *B32B 2363/00* (2013.01); *B32B 2551/00* (2013.01)

(58) Field of Classification Search
CPC ............ G02B 7/00; G02B 7/003; G02B 7/02; G02B 7/025; G02B 7/18; G02B 7/1805
See application file for complete search history.

(56) References Cited

U.S. PATENT DOCUMENTS

| | | | |
|---|---|---|---|
| 5,644,425 A | 7/1997 | Palmer | |
| 5,867,313 A | 2/1999 | Schweitzer et al. | |
| 5,930,036 A | 7/1999 | Cluff | |
| 5,943,174 A | 8/1999 | Bryant et al. | |
| 8,116,015 B2 | 2/2012 | Hamilton | |
| D663,337 S * | 7/2012 | Chan et al. | .......... D16/131 |
| 2007/0068058 A1 | 3/2007 | Remo | |

* cited by examiner

*Primary Examiner* — Joseph P Martinez
(74) *Attorney, Agent, or Firm* — Jackson Walker L.L.P.; Christopher J. Rourk

(57) ABSTRACT

An apparatus comprising a tubular housing having an axial length L and a circumferential length C. A first canopy secured to the tubular housing around a perimeter of the first canopy, the first canopy extends for an axial length L1 that is less than L and for a circumferential length C1 that is less than C/2. The first canopy has a front sloping section and a rear sloping section that extend from the perimeter to a semicircular outer perimeter. A second canopy disposed circumferentially opposite the first canopy and secured to the tubular housing around a perimeter of the second canopy. The second canopy extends an axial length L2 that is less than L and a circumferential length C2 that is less than C/2. The second canopy has a front sloping section and a rear sloping section that extend from the perimeter to a semicircular outer perimeter.

20 Claims, 7 Drawing Sheets

HOUSING FOR OPTICAL COMPONENTS

TECHNICAL FIELD

The present disclosure relates to optical components, and more specifically to a housing for optical components that includes opposing canopies with a reduced profile in place of bulkier body housings.

BACKGROUND OF THE INVENTION

Optical components can be housed in many different types of housings. These housings are typically symmetrical.

SUMMARY OF THE INVENTION

An apparatus is disclosed that includes a tubular housing having an axial length L and a circumferential length C. A first canopy is secured to the tubular housing around a perimeter of the first canopy, where the first canopy extends for an axial length L1 that is less than L and for a circumferential length C1 that is less than C/2. The first canopy has a front sloping section and a rear sloping section that each extend from the perimeter to a semicircular outer perimeter. A second canopy is disposed circumferentially opposite the first canopy and is secured to the tubular housing around a perimeter of the second canopy. The second canopy extends for an axial length L2 that is less than L and for a circumferential length C2 that is less than C/2. The second canopy has a front sloping section and a rear sloping section that each extend from the perimeter to a semicircular outer perimeter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
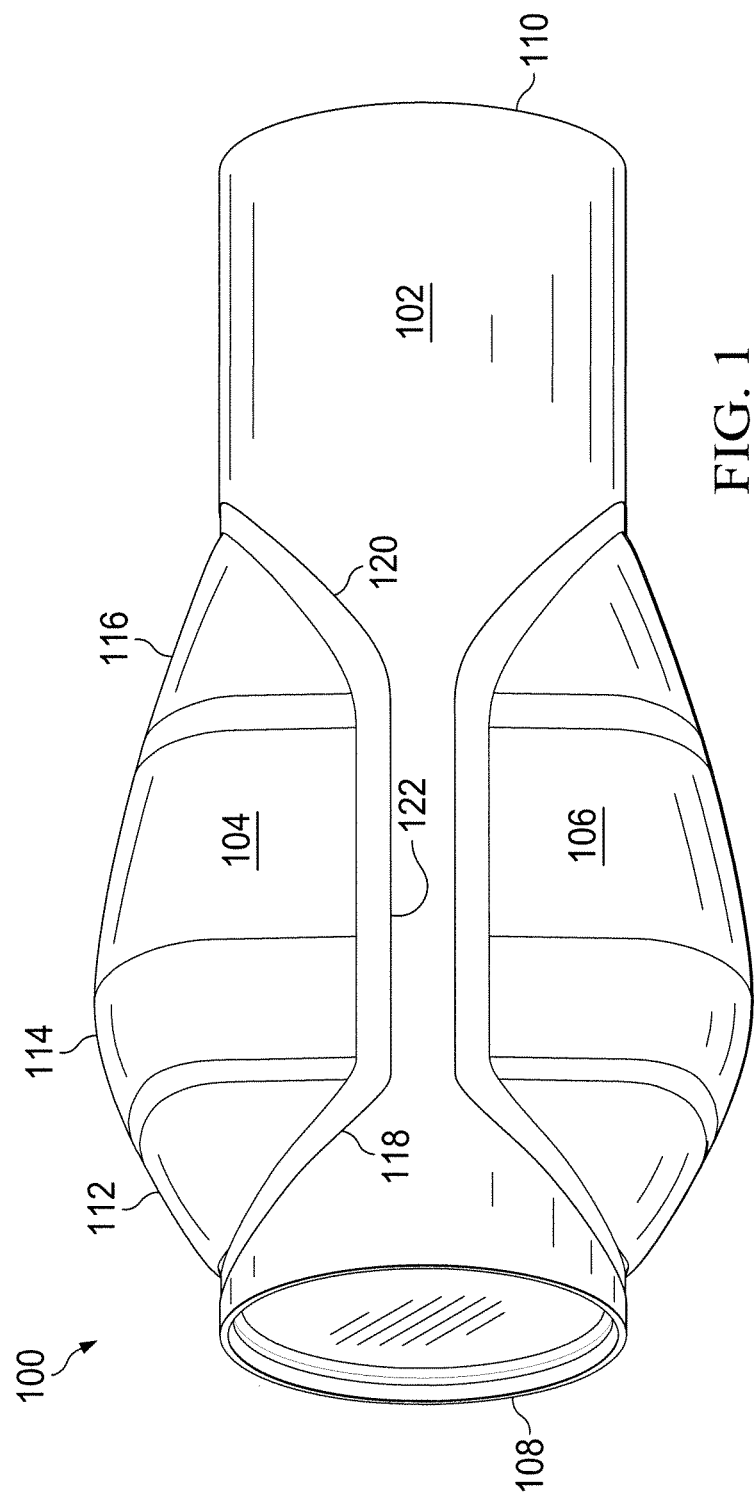
FIG. 1 is a diagram of a side view of a housing for an optical component in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a side view of a housing 100 for an optical component in accordance with an exemplary embodiment of the present disclosure. Housing 100 can be formed from epoxy, plastic, fiberglass, metal or other suitable materials. Housing 100 includes canopy 104, which is disposed on tubular body 102 opposite from canopy 106. In one exemplary embodiment, canopy 104 and canopy 106 can be identical, but canopy 104 can alternatively have a shape, length, circumferential width or other dimensions that are different from canopy 106, such as where the optical component or components contained within housing 100 are not symmetrical.

Canopy 104 includes an angled front section 118 that is attached to tubular housing 102 near front end 108. In one exemplary embodiment, canopy 104 can be attached around its perimeter to the surface of tubular housing 102 using an adhesive, an epoxy, a cement, a glue, by welding or in other suitable manners. Straight side portions 122 of canopy 104 are also attached along the perimeter to tubular housing 102 along the middle section of tubular housing 102, and angled rear section 120 is attached to tubular housing 102 near the rear 110 of tubular housing 102. Sloping front cover section 112 of canopy 104 can have a different shape and angle relative to the surface of tubular housing 102 than sloping rear cover section 116, and both sections meet at peak section 114, which can have a semicircular shape in a radial direction that intersects with straight side portions 122. In this manner, canopy 104 can be shaped so as to provide a housing for an internal optical component without the need for a bulky cylindrical shape, cubical shape or other shapes that would be symmetric around the circumference of tubular housing 102.

In addition, the use of canopies for portions of an enclosed optical assembly that do not fit within a tubular portion of the housing affords a significant weight reduction to the housing, because of the compact size. The canopy can also be configured to replace structural components that would otherwise be needed to support the internal optical components, or can be used for covering purposes only without providing any additional structural support. The canopies also provide a significant reduction in the diameter of the housing, as well as a significant weight reduction. While the diameter of any lens components of the optical assembly that are housed within the cylindrical portion of the housing drive the diameter of that cylindrical portion, the other components of the optical assemble, such as prisms, are typically not circumferential, and do not require a cylindrical housing. The smaller diameter of the loupe housing along with the unique non-cylindrical shape also allows for nose relief in the mounting and custom fitting of the final product.

Figure 2:
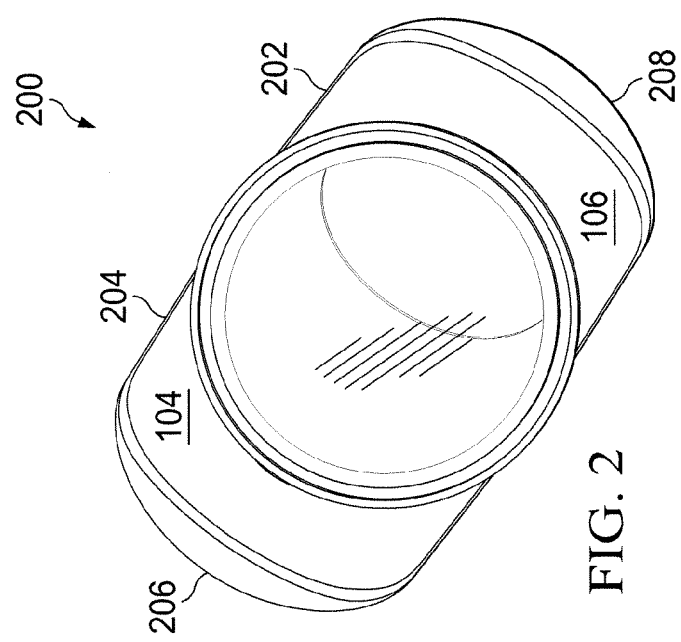
FIG. 2 is a diagram of an end view of a housing for an optical component in accordance with an exemplary embodiment of the present disclosure.

FIG. 2 is a diagram of an end view of a housing 200 for an optical component in accordance with an exemplary embodiment of the present disclosure. Housing 200 includes canopy 104, which has outer semicircular outer surface 206 and straight sides 204, and canopy 106, which has semicircular outer surface 208 and straight sides 202.

Figure 3:
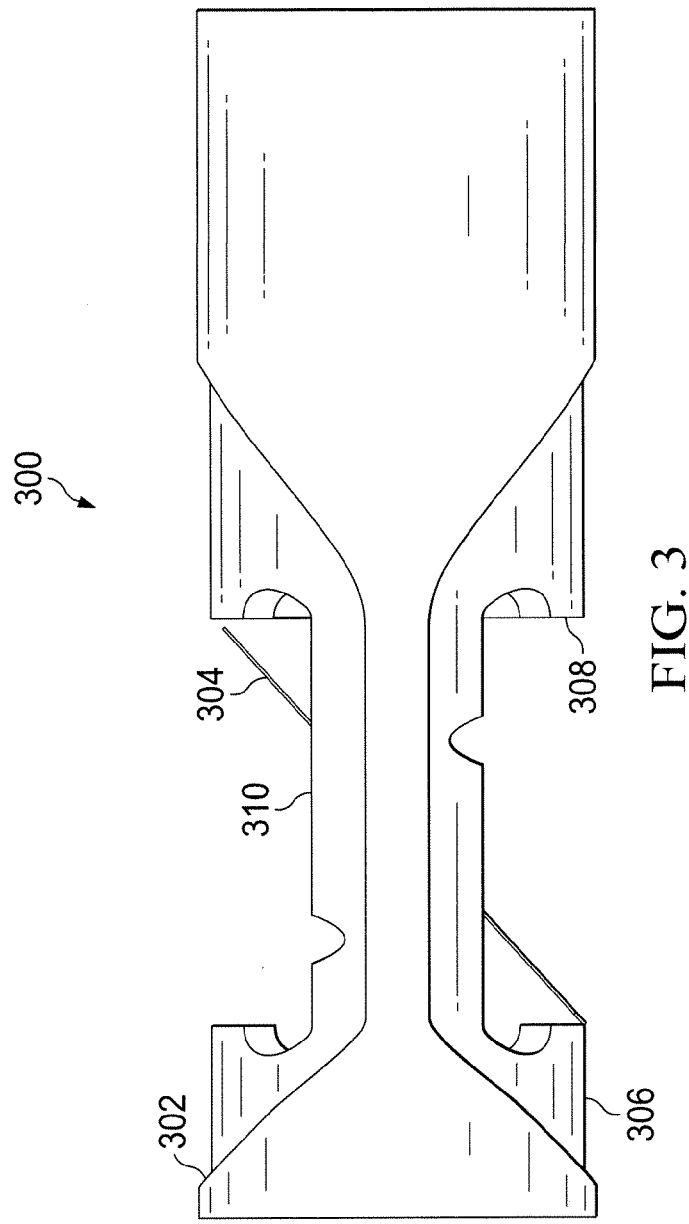
FIG. 3 is a diagram of a tubular portion of a housing for an optical component in accordance with an exemplary embodiment of the present disclosure.

FIG. 3 is a diagram of a tubular housing 300 for an optical component in accordance with an exemplary embodiment of the present disclosure. Tubular housing 300 includes canopy well 302 and canopy well 306, which are inset into the surface of tubular housing 300. Support 308 and support 310 used to provide structural support to two prism sections (not shown), and are formed by removing a hemispheric portion of tubular housing 300 to form a support structure. Mask 304 is used to separate the two prisms after they are installed, so as to define a predetermined optical path through tubular housing 300.

Figure 4:
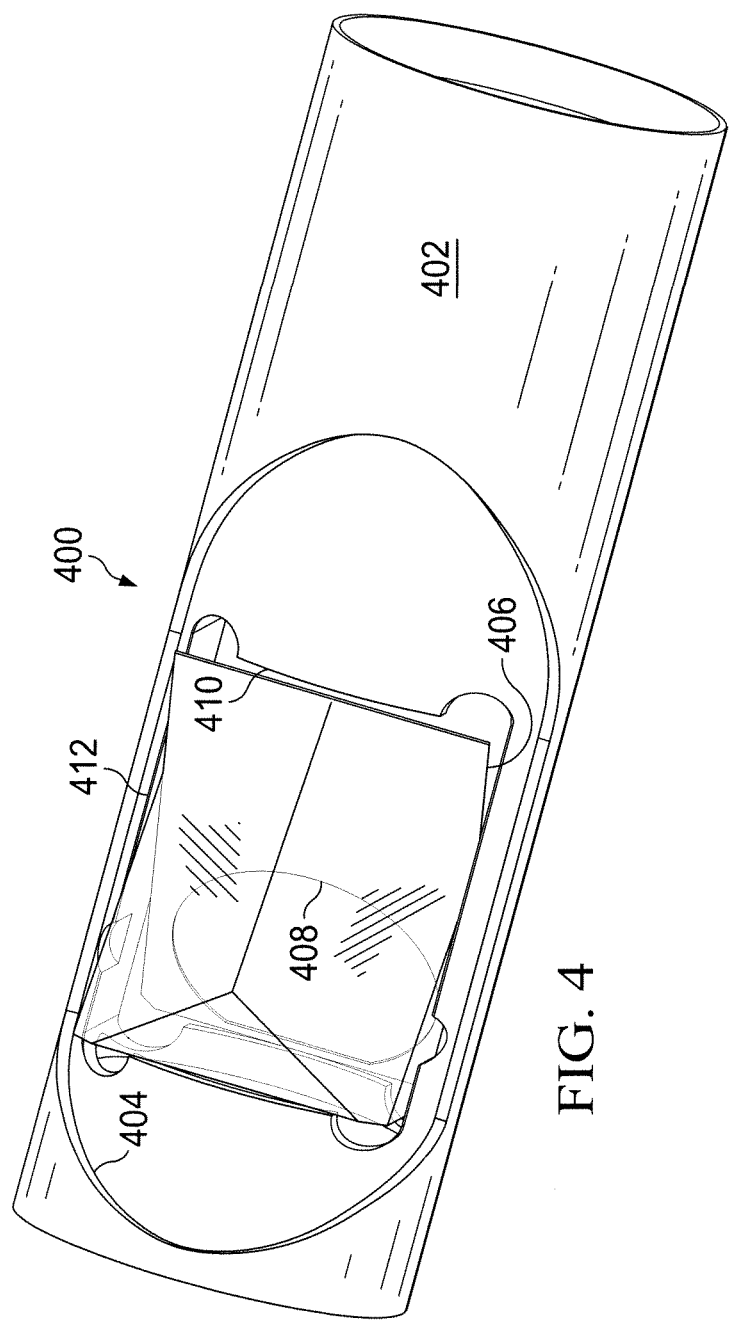
FIG. 4 is a diagram of a tubular portion of a housing for an optical component in accordance with an exemplary embodiment of the present disclosure.

FIG. 4 is a diagram 400 of a tubular portion of a housing 402 for an optical component in accordance with an exemplary embodiment of the present disclosure. Tubular housing 402 includes rear end 402, canopy well edge 404, internal edge 410, support 412 and mask 406, which includes aperture 408.

Figure 5:
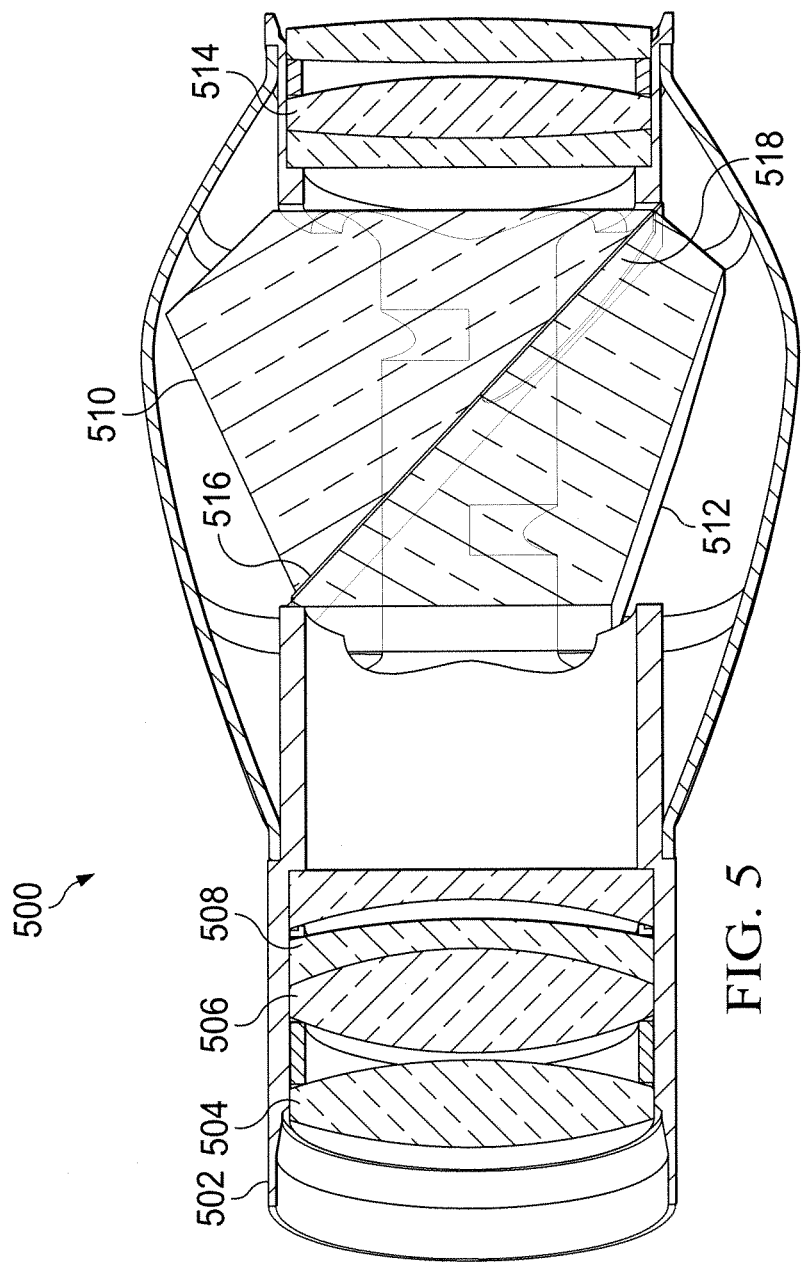
FIG. 5 is a diagram of a cut-away view of a tubular portion of a housing for an optical component in accordance with an exemplary embodiment of the present disclosure.

FIG. 5 is a diagram of a cut-away view of a tubular portion of a housing 500 for an optical component in accordance with an exemplary embodiment of the present disclosure. Housing 500 includes rear end 502 and optical components lens 504, lens 506, lens 508 prism 510, prism 512, mask 516 with aperture 518 and lens assembly 514. The optical components are contained within housing 500, and are supported by housing 500 without the need for external support structures. In this manner, housing 500 and the associated optical components are lighter in weight and smaller in size than if an external framing structure was used to hold one or more of the optical components.

Figure 6:
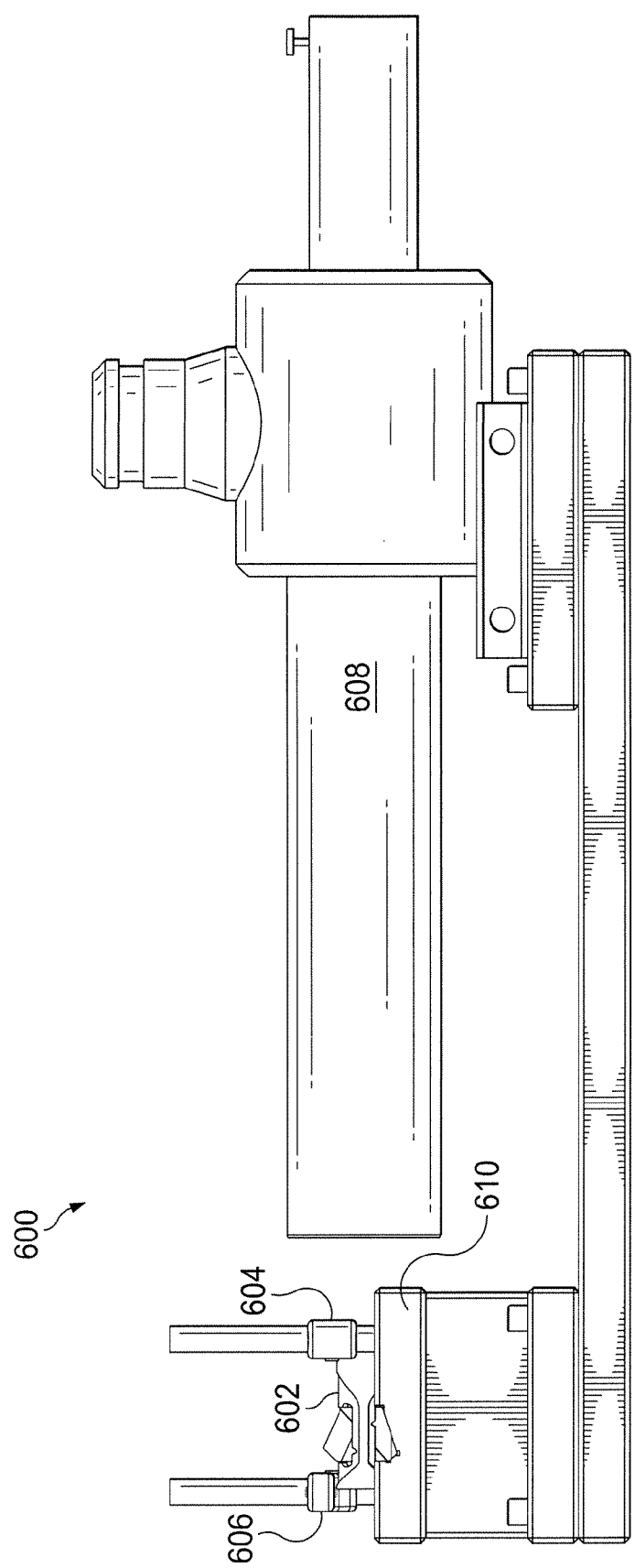
FIG. 6 is a diagram of an optical component alignment fixture in accordance with an exemplary embodiment of the present disclosure.

FIG. 6 is a diagram of an assembly 600 for aligning an optical component in accordance with an exemplary embodiment of the present disclosure. Assembly 600 includes housing 602, which is secured to support 610 by front support arm 504 and rear support arm 606. Inspection device 608 is used to observe the alignment of optical components within housing 602 prior to securing the optical components to housing 602 with epoxy, glue or other suitable compounds.

Figure 7:
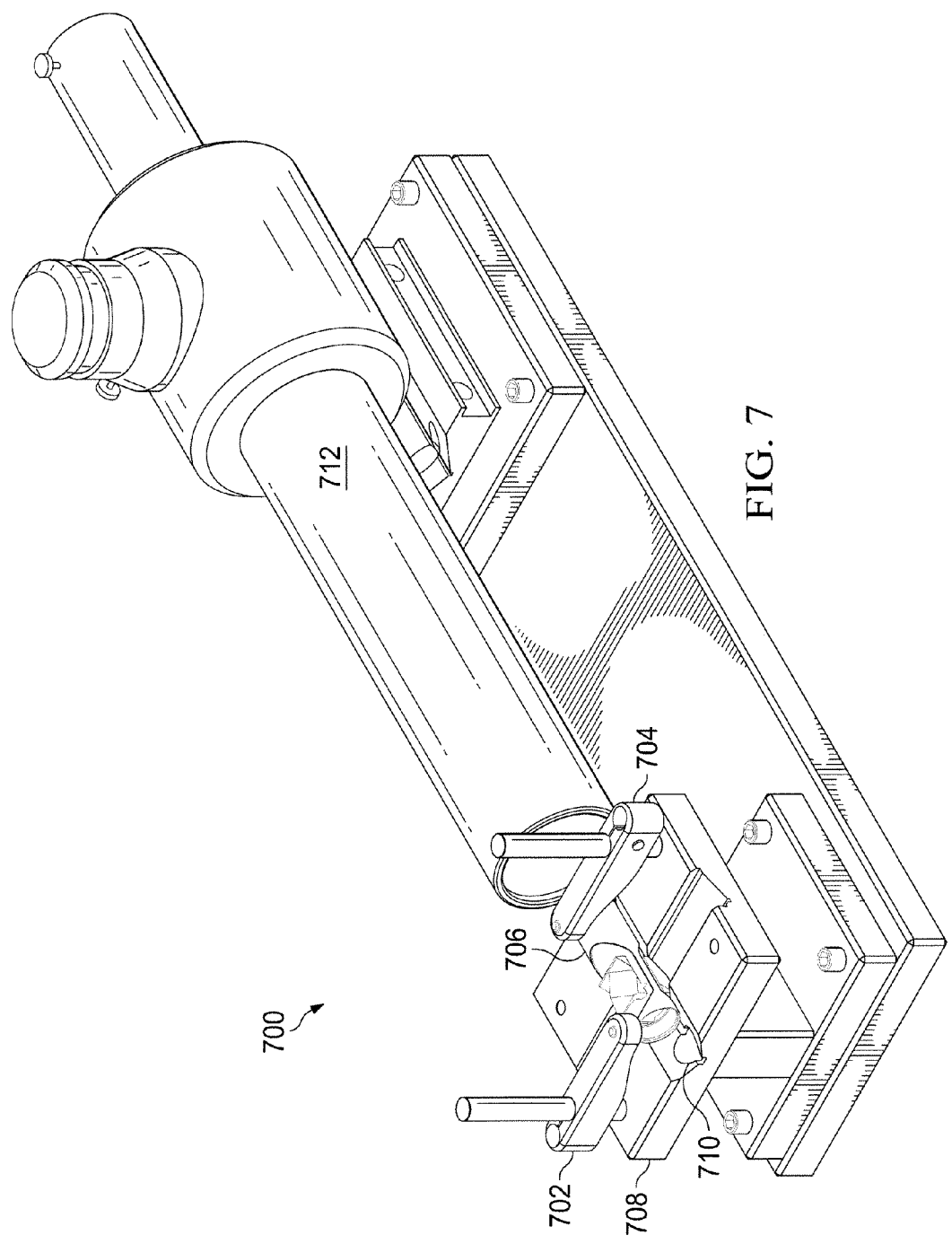
FIG. 7 is a diagram of an optical component in an optical component alignment fixture in accordance with an exemplary embodiment of the present disclosure.

FIG. 7 is a diagram of an assembly 700 for aligning an optical component in accordance with an exemplary embodiment of the present disclosure. Assembly 700 includes housing 706, which is first placed in v-shaped groove 710 of base 708. Front support arm 702 and rear support arm 704 are then secured into position, such as by using a set screw or in other suitable manners, and hold housing 706 firmly in position. Optical components are then installed into housing 706, and aligned using inspection device 712 before they are secured into position using epoxy, glue or other suitable compounds.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. An apparatus comprising:
   a tubular housing having an axial length L and circumferential length C;
   a first canopy secured to the tubular housing around a perimeter of the first canopy, the first canopy extending for an axial length L1 that is less than L and for a circumferential length C1 that is less than C/2, the first canopy having a front sloping section and a rear sloping section that each extend from the perimeter to a semicircular outer perimeter; and
   a second canopy disposed circumferentially opposite the first canopy and secured to the tubular housing around a perimeter of the second canopy, the second canopy extending for an axial length L2 that is less than L and for a circumferential length C2 that is less than C/2, the second canopy having a front sloping section and a rear sloping section that each extend from the perimeter to a semicircular outer perimeter.

2. The apparatus of claim 1 wherein the length C1 is different from the length C2.

3. The apparatus of claim 1 wherein the length L1 is different from the length L2.

4. The apparatus of claim 1 wherein an angle of the front sloping section of the first canopy relative to an axial surface of the tubular housing is different from an angle of the rear sloping section of the first canopy relative to the axial surface of the tubular housing.

5. The apparatus of claim 1 further comprising an optical assembly disposed within the tubular housing, the first canopy and the second canopy.

6. The apparatus of claim 1 further comprising an optical assembly disposed within the tubular housing, the first canopy and the second canopy, the optical assembly comprising a plurality of lenses and a plurality of prisms.

7. The apparatus of claim 1 further comprising an optical assembly disposed within the tubular housing, the first canopy and the second canopy, the optical assembly comprising:
   one or more first lenses;
   one or more prisms disposed axially adjacent to the one or more first lenses; and
   one or more second lenses disposed axially adjacent to the one or more prisms and opposite the one or more first lenses.

8. The apparatus of claim 1 further comprising an optical assembly disposed within the tubular housing, the first canopy and the second canopy, the optical assembly comprising two or more prisms separated by a mask.

9. The apparatus of claim 1 further comprising an optical assembly disposed within the tubular housing, the first canopy and the second canopy, the optical assembly comprising two or more prisms separated by a mask having an aperture.

10. A method for assembling an apparatus having a tubular housing having an axial length L and a circumferential length C, a first canopy secured to the tubular housing around a perimeter of the first canopy, the first canopy extending for an axial length L1 that is less than L and for a circumferential length C1 that is less than C/2, the first canopy having a front sloping section and a rear sloping section that each extend from the perimeter to a semicircular outer perimeter and a second canopy disposed circumferentially opposite the first canopy and secured to the tubular housing around a perimeter of the second canopy, the second canopy extending for an axial length L2 that is less than L and for a circumferential length C2 that is less than C/2, the second canopy having a front sloping section and a rear sloping section that each extend from the perimeter to a semicircular outer perimeter, the optical assembly comprising two or more prisms, the method comprising:
   placing a tubular housing in a v-shaped groove;
   securing a front portion of the tubular housing to the v-shaped groove using a first arm;
   securing a rear portion of the tubular housing to the v-shaped groove using a second arm;
   placing the optical assembly into a support structure of the tubular housing;
   securing the optical assembly into the tubular housing; and
   securing the first canopy and the second canopy over the optical assembly.

11. The method of claim 10 further comprising confirming an alignment of the optical assembly with an inspection device prior to securing the optical assembly into the tubular housing.

12. The method of claim 10 wherein securing the optical assembly into the tubular housing comprises securing the optical assembly into the tubular housing using one or more of an epoxy, a glue, a cement and an adhesive.

13. The method of claim 10 wherein securing the optical assembly into the tubular housing comprises:
   placing a first prism into the tubular housing;
   placing a mask into the tubular housing on the first prism; and
   placing a second prism into the tubular housing on the mask.

14. An apparatus comprising:
   a tubular housing having an axial length L and a circumferential length C;
   a first canopy secured to the tubular housing around a perimeter of the first canopy, the first canopy extending for an axial length L1 that is less than L and for a circumferential length C1 that is less than C/2; and
   a second canopy disposed circumferentially opposite the first canopy and secured to the tubular housing around a perimeter of the second canopy, the second canopy extending for an axial length L2 that is less than L and for a circumferential length C2 that is less than C/2.

15. The apparatus of claim 14 wherein the length C1 is different from the length C2.

16. The apparatus of claim 14 wherein the length L1 is different from the length L2.

17. The apparatus of claim 14 wherein an angle of a front sloping section of the first canopy relative to an axial surface of the tubular housing is different from an angle of a rear sloping section of the first canopy relative to the axial surface of the tubular housing.

18. The apparatus of claim 14 further comprising an optical assembly disposed within the tubular housing, the first canopy and the second canopy.

19. The apparatus of claim 14 further comprising an optical assembly disposed within the tubular housing, the first canopy and the second canopy, the optical assembly comprising a plurality of lenses and a plurality of prisms.

20. The apparatus of claim 14 further comprising an optical assembly disposed within the tubular housing, the first canopy and the second canopy, the optical assembly comprising:
   one or more first lenses;
   one or more prisms disposed axially adjacent to the one or more first lenses; and
   one or more second lenses disposed axially adjacent to the one or more prisms and opposite the one or more first lenses.

* * * * *

UNITED STATES PATENT AND TRADEMARK OFFICE
CERTIFICATE OF CORRECTION

PATENT NO.         : 9,176,297 B2                              Page 1 of 1
APPLICATION NO.    : 14/225294
DATED              : November 3, 2015
INVENTOR(S)        : Keith B. Wiley et al.

It is certified that error appears in the above-identified patent and that said Letters Patent is hereby corrected as shown below:

Claims
In Column 3, line 56, claim 1, insert --a-- after "and"

Signed and Sealed this
Third Day of May, 2016

Michelle K. Lee
*Director of the United States Patent and Trademark Office*